(No Model.)
C. F. BRUSH.
PROCESS OF AND APPARATUS FOR STRAIGHTENING CARBON RODS.
No. 263,757. Patented Sept. 5, 1882.
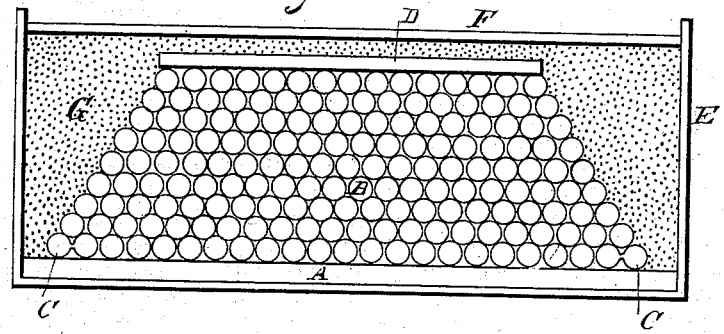
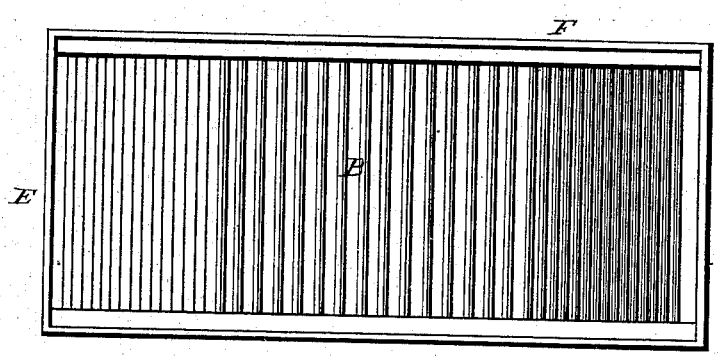
WITNESSES
Charles F. Brush INVENTOR
By Leggett & Leggett
ATTORNEYS

UNITED STATES PATENT OFFICE.

CHARLES F. BRUSH, OF CLEVELAND, OHIO.

PROCESS OF AND APPARATUS FOR STRAIGHTENING CARBON RODS.

SPECIFICATION forming part of Letters Patent No. 263,757, dated September 5, 1882.

Application filed June 4, 1881. (No model.)

*To all whom it may concern:*

Be it known that I, CHARLES F. BRUSH, of Cleveland, in the county of Cuyahoga and State of Ohio, have invented certain new and useful Improvements in Process of and Mechanism for Straightening Carbon Sticks; and I do hereby declare the following to be a full, clear, and exact description of the invention, such as will enable others skilled in the art to which it pertains to make and use it, reference being had to the accompanying drawings, which form part of this specification.

My invention relates to the manufacture of the carbon rods or sticks used in electric lighting by the voltaic arc; and it consists in the method or process of straightening carbons which have become bent or distorted during the process of manufacture. Such distortion (easy to prevent before the baking or calcining) often occurs during this part of the manufacture, and since the carbons after this operation are eminently rigid and more or less brittle it has heretofore been considered impracticable to straighten them, and their value has been greatly reduced or entirely destroyed. I have observed that however long or whatever number of times artificially-prepared carbons are calcined they continue to shrink in length, although to a less and less extent as the operation proceeds. During this continued process of calcination and shrinkage I find that the carbons are very slightly plastic, but sufficiently so to allow of their being straightened, if previously distorted, by the application of moderate but long-continued stress in suitable directions while they are maintained at a high temperature. I attribute the long-continued shrinking and slight plasticity of the carbons to the continued but very gradual elimination of hydrogen, which element I think can never be entirely expelled.

I have in view several processes for the more complete elimination of hydrogen from carbon used in electric lighting, both by the arc and by the incandescent plan, for which I intend to apply for Letters Patent in due time, and I do not hereby waive the right to embody and claim in such application any matter pertaining to these processes which may appear in this specification.

I accomplish my object of straightening carbons previously distorted during calcination by packing them in a peculiar manner in suitable pots or boxes and recalcining them. I place in the bottom of a rectangular pot of adequate dimensions and of suitable material a flat slab or plate of slate, stone, or other suitable material not liable to become bent or warped at a high temperature. On this slab is placed, horizontally and side by side, a layer of carbon rods to be straightened, nearly or quite touching each other, and preferably with their principal curvature or distortion in a vertical plane. This precaution, although desirable in this and subsequent layers of carbons, is not always essential. Directly on the first layer of carbons another layer is placed in quincunx order, having one less carbon than the layer below, and so on, until the pot is sufficiently filled. A slab or plate similar to the one at the bottom of the pile of carbons is placed on the top layer to act as a weight and a protection against the entrance of sand into the pile. This weight is not absolutely essential to the success of the process, but is generally desirable. The pot is of such size that a space of an inch or more is left between its sides and the ends of the carbons forming the pile. The space at the sides, ends, and top of the pile of carbons is filled with clean sand; but any tilting of the pot, by reason of which sand would be caused to flow into the spaces between the carbons, is very carefully avoided. The sand is used simply to protect the carbons from access of air during the subsequent baking, and hence any other suitable material, capable or not of flowing like sand—such, for instance, as pulverized coke—may be used in its stead. A lid or cover over the pot is advisable as a further protection.

In order to preserve the integrity of the pile or pyramid of carbons, both during its building and subsequently, it is necessary to prevent lateral motion of the end carbons of the bottom layer. If these carbons are simply blocked against the ends of the pot or are confined by placing a foreign body between them and the ends of the pot, they are sure to become displaced when the pot expands in heating, and the sand or other filling material flows to fill the increased space. In such a case the whole pile of carbons is liable to become displaced. It is necessary, then, to anchor the end carbons of the bottom layer into the pile itself in order to prevent this accident. I overcome this difficulty by employing double or triple carbons for the ends of the first layer.

In molding the carbons many parallel rods are formed at once, all joined together by a thin web. I break up these sets ordinarily into single rods; but for the purpose described I leave two or more still joined by their webs and use these preferably, after being baked, for the ends of the first layer of carbons in the calcining-pot. Thus rolling or sliding of the end members of this layer is effectually prevented, and the stability of the whole pile is assured.

It will be evident that all the members of the pile of carbons I have described will, by the weight of those above or of the slab at top, or both, and in the absence of sand or other packing material between them, tend to become parallel and straight, and will assume this disposition when rendered sufficiently plastic by heat, and will retain it when subsequently cooled. Of course some members of the pile will remain more or less distorted after passing through the straightening process. These may be again treated with others, so that the number of carbons finally lost through distortion is very small indeed compared with the number found crooked after the ordinary baking process is completed.

In the drawings, Figure 1 shows in vertical section, transverse to the carbons, a pot filled and ready for the furnace. Fig. 2 is a plan view of the pot and carbons, Fig. 1, with the cover F, slab D, and sand G removed.

In Fig. 1, A is the plate or slab on which the pile or pyramid of carbons B rests. The ends of the lowest row of carbons consist of twin carbons, C C. D is the slab or weight placed at the top of the pile B. E is the containing-pot, of cast-iron or other suitable material, of which F is a cover. G represents the protecting-filling of sand or other suitable material.

Obviously the pot E and its contents may be heated rapidly and to a high temperature at once, instead of receiving the very slowly increasing heat found necessary when freshly-molded carbons are being baked, and hence the time required for the straightening process may be very much less than required for the original baking.

What I claim is—

1. In the method or process of straightening deformed or bent carbon rods or sticks, arranging bent carbon rods or sticks in a pyramidal pile in a receptacle, inserting packing material at the sides and ends of the pile, and leaving the spaces between the carbon rods vacant, substantially as set forth.

2. The method of straightening deformed or bent carbon rods or sticks, consisting in arranging the bent carbon rods or sticks in a pyramidal pile in a receptacle and on a supporting-slab formed of suitable material to withstand warping and inserting packing material at the sides and ends of the pile and leaving the spaces between the carbon rods vacant, substantially as set forth.

3. The method of straightening deformed or bent carbon rods or sticks, consisting in arranging them in pyramidal form within a suitable receptacle, inserting packing material at the sides and ends of the pile and leaving the interspaces vacant, and subjecting the pile to the pressure of a superior cumbent weight while it is being heated, substantially as and for the purpose set forth.

4. A pyramidal pile of bent or deformed carbon sticks or rods, having its lower course provided at its opposite ends with twin or compound carbons, substantially as and for the purpose set forth.

5. The combination, with the inclosing-box E and slab A, of the pyramidal pile of bent or deformed carbons B, the slab D, and packing G, substantially as and for the purpose set forth.

In testimony whereof I have signed my name to this specification in the presence of two subscribing witnesses.

CHARLES F. BRUSH.

Witnesses:
  JNO. CROWELL, Jr.,
  ALBERT E. LYNCH.